Patented Apr. 14, 1936

2,037,012

UNITED STATES PATENT OFFICE 2,037,012

PROCESS FOR THE PRODUCTION OF POLYVINYL COMPOUNDS

Henry Dreyfus, London, England

No Drawing. Original application March 24, 1932, Serial No. 601,060. Divided and this application June 17, 1933, Serial No. 676,332. In Great Britain March 30, 1931

4 Claims. (Cl. 260—2)

This invention relates to compounds containing a polyvinyl residue, more particularly to the manufacture of compounds adapted for use as sizes or impregnating agents for textile and other materials, the present application being a division of my co-pending application S. No. 601,060 filed 24th March, 1932.

It is known that by the action of acetylene or compounds containing carboxylic or hydroxyl groups under suitable conditions, particularly in the presence of mercury salts, it is possible to obtain esters or ethers of vinyl alcohol. Inorganic vinyl esters, for example vinyl chloride, may be obtained analogously from inorganic acids. These esters or ethers may be readily polymerized, for example by subjecting them to the action of heat or light, so as to obtain resinous or rubber-like products. These polymerized esters or ethers are apparently to be regarded as esters or ethers of polyvinyl alcohols, which compounds may in fact be obtained by saponification of polymerized vinyl acetate or other polymerized vinyl ester. The flexible or rubber-like polymerization products of vinyl acetate are insoluble in water but soluble in organic solvents. They have excellent adhesive qualities and are well adapted for sizing textile yarns or threads prior to weaving but for their water-insolubility which renders difficult their subsequent removal from the materials.

According to the present invention valuable polyvinyl compounds containing hydroxyl groups are obtained by partially hydrolyzing polymerized vinyl esters, if desired in presence of solvents, by means of acid hydrolyzing agents. As compared with the non-hydrolyzed products the partially hydrolyzed products dissolve or disperse in water or other aqueous liquids with greater facility. On this account they constitute valuable materials for sizing and impregnating fibrous materials, and in particular textile yarns or other textile materials where a size or the like is required which is capable of ready removal by washing or scouring in aqueous liquids.

The partial hydrolysis of the polymerized vinyl esters may be effected in various ways. For example the ester may be dissolved in acetic or other lower fatty acid containing water, and if desired a mineral acid such as sulphuric acid, and allowed to stand with or without heating until hydrolyzed to the desired degree. Again polymerized vinyl acetate dissolved in alcohol may be partially hydrolyzed with the aid of an acid. It is in general preferable, however, to effect hydrolysis of the polymerized vinyl compounds in solution in a lower fatty acid, since the reaction then proceeds very smoothly and the reaction mixture is little liable to become heterogeneous by separation of hydrolyzed product.

In the partially hydrolyzed products the proportion of hydrophile groups relative to that of the $C_2$ groupings constituting the polyvinyl residues may vary within wide limits, and by suitably selecting this proportion compounds of almost any desired degree of solubility or dispersibility in water or other aqueous liquid may be obtained.

The esters employed as starting materials may be of any desired degree of polymerization and viscosity characteristics. For example a highly polymerized vinyl acetate may be employed.

The present invention extends not only to compounds containing the vinyl group, that is the group $CH_2=CH-$, but also to analogous compounds in which hydrogen atoms of the vinyl residue are replaced by other atoms or groups. Thus, a polymerized substituted vinyl ester (i. e. a compound containing the grouping $$>C=C<_R$$

where R is an acid radicle) may be subjected to partial hydrolysis so as to obtain a product containing free hydroxyl groups.

The invention is illustrated but not limited by the following example:—

Example 10 parts of polymerized vinyl acetate are dissolved in 50 parts of acetic acid or 90 per cent. strength containing 1 part of sulphuric acid. The mixture is then maintained at 40–60° C. until a sample of the product is soluble in aqueous alcohol of 30–50 per cent. strength. After separating from the acetic acid, e. g. by dilution with water and dialysis, the product may be used for sizing textile yarns.

In the same way the poly-(methylvinyl)-acetate obtainable by polymerization of methylvinyl acetate may be partially hydrolyzed. The latter may be obtained for instance by condensation of methyl acetylene with acetic acid in presence of a mercury compound catalyst.

What I claim and desire to secure by Letters Patent is:—

1. Process for the production of polyvinyl compounds at least colloidally soluble in aqueous media, which comprises partially hydrolyzing a polymerized vinyl ester in solution in a lower fatty acid with an aqueous acid hydrolyzing agent.

2. Process for the production of polyvinyl compounds at least colloidally soluble in aqueous media, which comprises partially hydrolyzing a polymerized vinyl ester in solution in acetic acid with an aqueous acid hydrolyzing agent.

3. Process for the production of polyvinyl compounds at least colloidally soluble in aqueous media, which comprises partially hydrolyzing a polymerized vinyl ester in solution in a lower fatty acid with aqueous strong mineral acid.

4. Process for the production of polyvinyl compounds at least colloidally soluble in aqueous media, which comprises partially hydrolyzing polymerized vinyl acetate in solution in aqueous acetic acid with a strong mineral acid.

HENRY DREYFUS.